(12) United States Patent
Cavarec et al.

(10) Patent No.: US 11,098,590 B2
(45) Date of Patent: Aug. 24, 2021

(54) BLADE OF A TURBINE ENGINE HAVING A CHORD LAW FOR A HIGH FLUTTER MARGIN

(71) Applicant: Safran Aircraft Engines, Paris (FR)

(72) Inventors: Mickael Cavarec, Moissy-Cramayel (FR); Sadim Dieudonne, Moissy-Cramayel (FR); Nicolas Pierre Alain Edme De Cacqueray-Valmenier, Moissy-Cramayel (FR); Guillaume Pascal Jean-Charles Gondre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 29 days.

(21) Appl. No.: 16/710,931

(22) Filed: Dec. 11, 2019

(65) Prior Publication Data

US 2020/0182064 A1 Jun. 11, 2020

(30) Foreign Application Priority Data

Dec. 11, 2018 (FR) ...................................... 1872698

(51) Int. Cl.
*F01D 5/14* (2006.01)

(52) U.S. Cl.
CPC .......... *F01D 5/141* (2013.01); *F05D 2220/30* (2013.01); *F05D 2240/30* (2013.01); *F05D 2240/301* (2013.01)

(58) Field of Classification Search
CPC ...................................................... F01D 5/141
See application file for complete search history.

(56) References Cited

U.S. PATENT DOCUMENTS

| 4,012,172 A | 3/1977 | Schwaar et al. |
| 9,347,323 B2* | 5/2016 | Gallagher ................. F02K 3/04 |

FOREIGN PATENT DOCUMENTS

| WO | 2015/126450 A1 | 8/2015 |
| WO | 2015/126451 A1 | 8/2015 |
| WO | 2015/126824 A1 | 8/2015 |

OTHER PUBLICATIONS

Preliminary Research Report received for French Application No. 1872698, dated Sep. 30, 2019, 3 pages (1 page of French Translation Cover Sheet and 2 pages of original document).

* cited by examiner

*Primary Examiner* — Justin D Seabe
(74) *Attorney, Agent, or Firm* — Womble Bond Dickinson (US) LLP (57) ABSTRACT

A turbine engine rotor blade including a plurality of blade cross sections stacked along an axis Z between a blade root and a blade tip defining therebetween the height of the blade, each blade cross section including a leading edge (16) and a trailing edge (17) and a chord defined by the length of the segment which extends from the leading edge to the trailing edge and ensuring that:
the ratio of the chord at mid-height and of the chord at the blade root is comprised between 140% and 160%;
the ratio of the chord at the blade tip and of the chord at the blade root is comprised between 115% and 135%;
the chord is locally constant in a blade root zone and in a blade mid-height zone.

8 Claims, 7 Drawing Sheets

BLADE OF A TURBINE ENGINE HAVING A CHORD LAW FOR A HIGH FLUTTER MARGIN

GENERAL TECHNICAL FIELD AND PRIOR ART

The invention relates to the field of turbine engine blades, and more particularly the field of turbine engine rotor blades.

The invention is intended to be used in fans inside a turbojet or a turbine engine.

A turbine engine comprises at least one blading, such as a fan for example, which includes a plurality of blades arranged radially around a central axis, for example around a disk. Such a blading forms either a rotor, when it is a movable blading or a bladed disk, or a stator.

The blades can be considered to be excrescences relative to a continuous ring. Two adjoining blades and the ring define an air flow corridor.

The proximal end of each blade relative to the central axis is customarily designated the blade root. In particular, the blade root is considered here to be the portion of the blade situated above the ring.

The distal end is customarily designated the blade tip. The distance between the root and the blade tip is known as the blade height.

Between the root and the blade tip, the blade can be represented theoretically by a stack of cross sections or aerodynamic profiles perpendicular to a radial axis Z.

The blade is a complex part to develop because it is involved simultaneously in aerodynamic, mechanical, and acoustic aspects of the blading and of the turbine engine. The design of the blade and of the blading requires working simultaneously on aerodynamic performance, mechanical strength and the reduction of masses, noise and cost.

The design must guarantee a minimum lifetime of the blade and of the disk to which the blades are attached.

The design must guarantee a minimum vibration endurance of the blading, i.e. a sufficient resistance to vibrations, or an acceptable level of vibrations for ensure mechanical strength.

The blading must have an endurance for ingesting foreign bodies and endurance of a blade ejection phenomenon, i.e. resistance of the blading to situations where a blade is detached partially or entirely from the disk.

The phenomenon of flutter must be taken into account during the design of the blade and of the blading.

Flutter is an aeromechanical coupling due to the relative movement of air with respect to the structure of the blades and of the blading. Flutter is a self-maintaining phenomenon, the modification of the solid structure modifying the flow of fluid and the modification of the flow of fluid generating forces on the solid structure. Flutter can amplify rapidly and lead to the breakage of a fan blade, even damage to the engine.

Flutter is strongly linked to the design of the structure, so that it is difficult to eliminate or even to limit a flutter phenomenon once it has been detected in the operation of a fan.

There remains then the possibility of prohibiting certain zones of operation to limit the risks linked to flutter, but this necessarily reduces the flight conditions in which the fan can operate.

Document US 2018/0100399 A1 presents a method for profiling a turbine rotor blade while taking into account the flutter phenomenon.

There exists therefore a need for a blade and blading for which the zone of operation where flutter appears is as far as possible from the nominal operation zone, i.e. a blade and blading which has the highest possible flutter margin.

GENERAL PRESENTATION OF THE INVENTION

A general goal of the invention is to palliate the disadvantages of blades and fans of the prior art.

In particular, one aim of the invention is to propose a solution for increasing flutter margin.

Another goal is to propose a blading which has better resistance to the blade ejection phenomenon.

For its part, the invention proposes a turbine engine rotor blade including a plurality of blade cross sections stacked along an axis Z between a blade root and a blade tip defining therebetween the height of the blade, each blade cross section including a leading edge and a trailing edge and a chord defined by the length of the segment which extends from the leading edge to the trailing edge, characterized in that:

the ratio of the chord at mid-height and of the chord at the blade root is comprised between 140% and 160%;

the ratio of the chord at the blade tip and of the chord at the blade root is comprised between 115% and 135%;

A blade of this type is advantageously completed by the following different features taken alone or in combination:

the ratio of the chord at mid-height of the blade and of the chord at the blade root is comprised between 145% and 155%;

the ratio of the chord at the blade tip and of the chord at the blade root is comprised between 120% and 130%;

the chord is locally constant at the blade root and at the mid-height of the blade;

the curve of the chord of a blade cross section as a function of its height varies continuously as a function of said height, and the slope of the tangent to the curve of the chord varies continuously as a function of said height;

The invention also relates to a turbine engine fan including a plurality of rotor blades as described above.

The invention also relates to a turbine engine which comprises a fan of this type.

PRESENTATION OF THE FIGURES

Other features and advantages of the invention will be revealed by the description that follows, which is purely illustrative and not limiting, and must be read with reference to the appended drawings in which.

DESCRIPTION OF ONE OR MORE IMPLEMENTATIONS AND EMBODIMENTS

Turbine Engine—General Presentation

Figure 1:
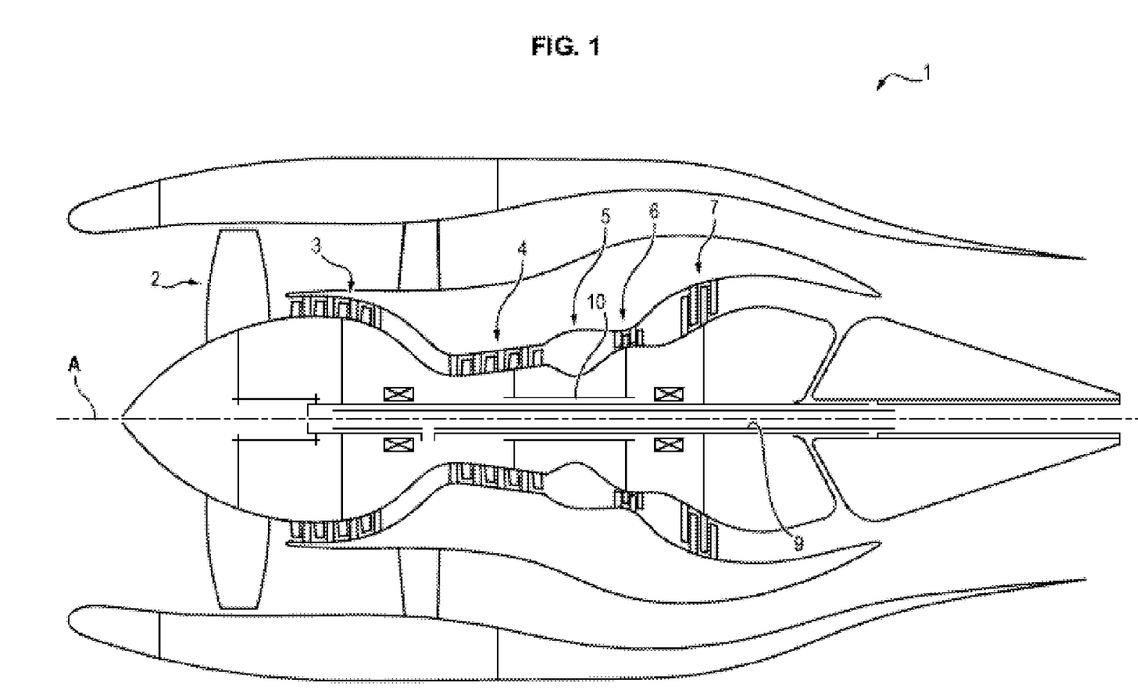
FIG. 1 is a schematic longitudinal section of a turbine engine.

With reference to FIG. 1, a turbine engine is shown schematically, more specifically a double flow axial turbojet 1. The turbojet 1 illustrated includes a fan 2, a low-pressure compressor 3, a high-pressure compressor 4, a combustion chamber 5, a high-pressure turbine 6 and a low-pressure turbine 7.

The fan 2 and the low-pressure compressor 3 are connected to the low-pressure turbine 7 by a first transmission shaft 9, while the high-pressure compressor 4 and the high-pressure turbine 6 are connected by a second transmission shaft 10.

During operation, a flow of air compressed by the low and high pressure compressors 3 and 4 feeds combustion in the combustion chamber 5, from which the expansion of combustion gases drives the high and low pressure turbines 6, 7. Through the shafts 9 and 10, the turbines 6, 7 thus drive the fan 2 and the compressors 3, 4. The air propelled by the fan 2 and the combustion gases leaving the turbojet 1 through a propulsive nozzle (not illustrated) downstream of the turbines 6, 7 exert reaction thrust on the turbojet 1 and, through it, on a vehicle or machine such as an airplane (not illustrated).

Figure 2:
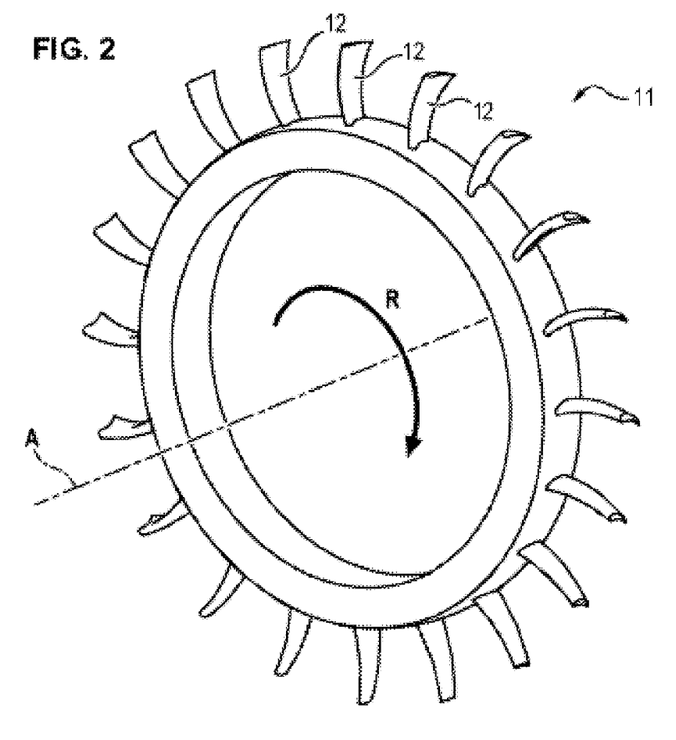
FIG. 2 is a schematic perspective view of a turbine engine fan rotor.

Each compressor 3, 4 and each turbine 6, 7 of the turbojet 1 includes several stages, each stage being formed by a fixed blading or stator, and a movable blading or rotor. With reference to FIG. 2, a turbine engine fan rotor 11 is illustrated schematically. This rotor 11 includes a plurality of blades 12 arranged radially around the axis of rotation A of the rotor 11, which is substantially parallel to the general working fluid flow direction through the turbojet 1.

The blades 12 can constitute parts that are distinct from the rest of the rotor and be applied to it by attachment means generally known in the state of the art, such as pinned fasteners or fir-tree attachments.

Figure 3:
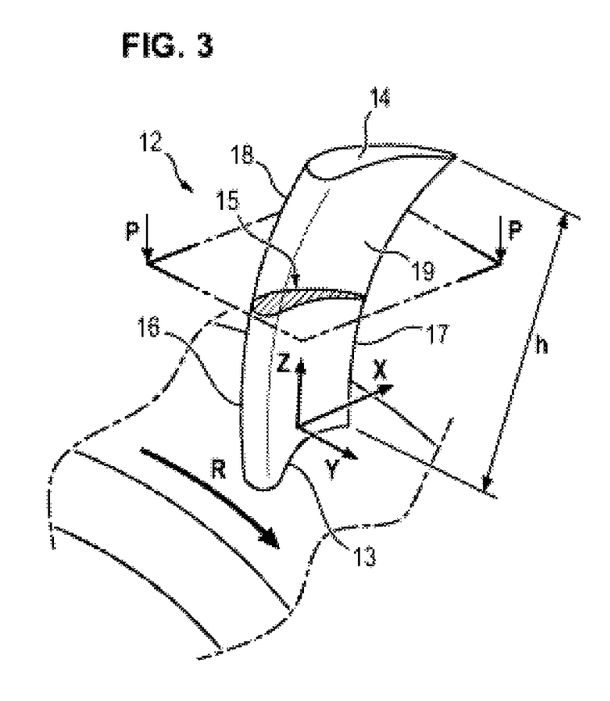
FIG. 3 is a schematic perspective view of a detail of the rotor of FIG. 2.

With reference to FIG. 3, a schematic perspective view of a detail of the rotor of FIG. 2 is proposed. Each blade 12 has a spatial reference system with three orthogonal axes X, Y and Z.

The axis X is parallel to the axis of rotation A of the rotor 11, the axis Y is tangential to the rotation direction R of the blade 12 around the axis of rotation A, and the axis Z is a radial axis along a direction transverse to the axis of rotation A.

Each blade 12 includes a blade root 13 and a blade tip 14 separated by a blade height h in the direction of the radial axis Z.

Between the blade root 13 and the blade tip 14, the blade 12 can be represented theoretically by a stack of cross sections or aerodynamic profiles 15 in planes perpendicular to the radial axis Z.

The turbine engine rotor blade can be described as including a plurality of blade cross sections stacked along an axis Z between the blade root and the blade tip, defining therebetween the blade height h.

Figure 4:
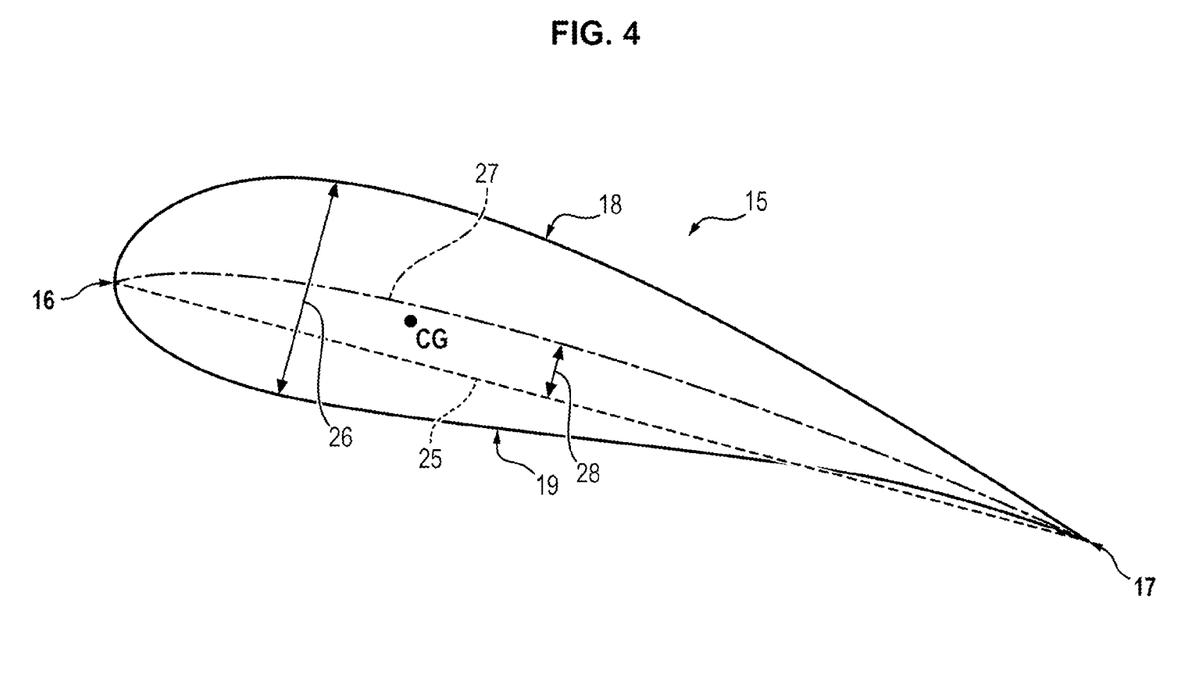
FIG. 4 shows schematically a cross section of a blade.

A plane P of this type is shown in FIGS. 3 and 4.

The blade 12 includes a leading edge 16 in the upstream direction, a trailing edge 17 in the downstream direction, an upper surface 18 and an inner surface 19.

Each blade cross-section can be described as including a leading edge and a trailing edge. In a compressor or fan rotor, the direction of rotation R during normal operation is such that each blade 12 moves in the direction of its inner surface 19.

One blade cross section 15 is shown schematically in FIG. 4, with a chord line 25 and a camber line 27.

The chord line 25 is a segment, i.e. a portion of a straight line, connecting the leading edge 16 and the trailing edge 17 in this cross section 15.

In the present text, the term "chord" alone is used to designate the length of the segment corresponding to the chord line, i.e. the distance between these two points farthest apart.

The camber line 27 is a curve equal to the mean of the upper surface 18 curve and the inner surface 19 curve in said cross section 15. More precisely, the camber line is formed of all the points situated at equal distance from the upper surface 18 and the inner surface 19. The distance from a particular point to the upper surface (or the inner surface) is defined here as the minimum distance between the particular point and a point of the upper surface (or inner surface).

Also shown by double arrows in this FIG. 4:
- the maximum thickness 26 of the cross section (maximum distance between the upper surface 18 and the inner surface 19) in a direction perpendicular to the chord line,
- the maximum distance or maximum sweep 28 between the chord 25 and the camber line 27; maximum sweep corresponds to the maximum length of a segment perpendicular to the chord line and connecting a point on the chord line and a point on the camber line;
- the center of gravity CG of the blade cross section, which is the barycenter of the masses of the blade cross section. The position of the center of gravity is defined in the plane of the cross section relative to the axis Z, i.e. by X- and Y-axis coordinates in said cross section.

Chord Laws

The chords of the blades vary as a function of the height of the cross section corresponding to them in the blade root height.

It has been noted by the inventors that specific chord laws allowed much better flutter margins.

This is the case in particular when the following relations are satisfied:
- the ratio of the chord at mid-height and of the chord at the blade root is comprise between 140% and 160%;
- the ratio of the chord at the blade tip and of the chord at the blade root is comprised between 115% and 135%.

Better margins are also obtained if the following chord relations are satisfied:
- the ratio of the chord at the mid-height of the blade and of the chord at the blade root is comprised between 145% and 155%,
- the ratio of the chord at the blade tip and of the chord at the blade root is comprised between 120% and 130%.

Figure 5:
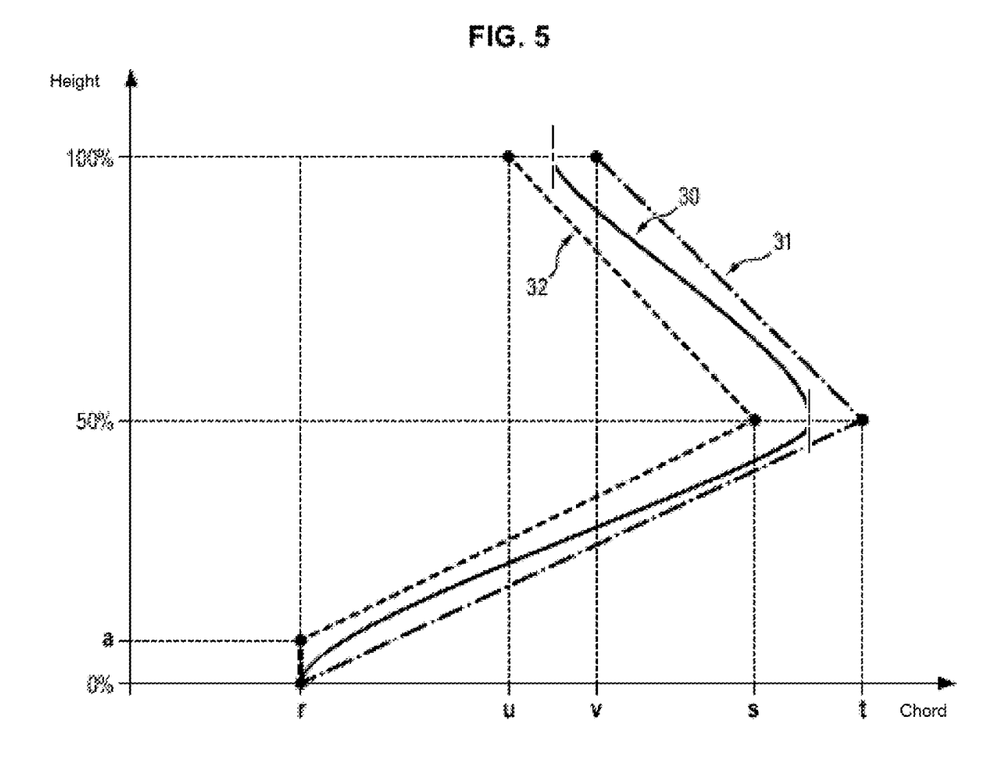
FIGS. 5 and 6 are diagrams illustrating the evolution, between the root and the blade tip, of the chord of a blade according to the invention.

A chord law in this sense is illustrated in the graph of FIG. 5, in which the value of the chord is given as the abscissa, while the height of the blade section is supplied as the ordinate, 0% corresponding to a reference to the blade root, 100% corresponding to the blade tip.

In this graph:
r is the value of the chord at the blade root (blade cross section corresponding to a height of 0%), u and v are limiting values which bound the chord value at the blade tip (height of 100%), s and t are limiting values which bound the value of the chord at the mid-height of the blade (height of 50%), a is a strictly positive height value.

The chord values r, s, t, u, v and the height value a satisfy for example the following relations:

$(s/r)=140\%$ or $(s/r)=145\%$ $(t/r)=160\%$ or $(t/r)=155\%$ $(u/r)=115\%$ or $(u/r)=120\%$ $(v/r)=135\%$ or $(v/r)=130\%$ $a=5\%$ or $a=15\%$

In FIG. 5, the chord law of the blade is represented by the continuous-line curve 30 on this graph.

The curve 30 represents the variations of the chord of the blade cross section as a function of its height. The curve 30 can be a continuous curve, for which a tangent can be defined at each of its points.

It is then possible to define a derivative of the chord of the blade cross section as a function of its height. This derivative can itself correspond to a continuous curve. In this situation where the derivative is continuous, the curve 30 of the blade cross-section chord as a function of its height has no angular points, or there would be a break in the slope of its tangent. The slope of the tangent to the curve 30 varies continuously as a function of height.

The curve 30 is comprised between two bounding curves 31 and 32, which are two piecewise affine curves (curves formed from straight-line segments).

Curve 31 (shown in a mixed dotted line) is defined in this particular case by two rays:
one extending between a point corresponding to a chord value equal to r for a height of 0% and a chord value point equal to t for a height of 50%,
the other extending between said point of point value equal to t for a height of 50% and a point corresponding to a chord value equal to v for a height of 100%.

The curve 32 (shown in a simple dotted line) is defined by a ray extending between a point with a chord value equal to "r" for a strictly positive height "a" and a point corresponding to a chord value equal to "s" for a height of 50%,
by a ray which extend from said point corresponding to a chord value equal to "s" for a height of 50% to a point with a chord value equal to "u" for a height of 100%.

As illustrated in FIG. 5, the chord can be locally constant in the blade root zone.

It can also be locally constant in the blade mid-height zone and in the blade tip zone.

It is specified that:
the blade mid-height zone corresponds to the height interval between 40% height and 60% blade height, and can more particularly designate the height interval between 45% height and 55% height;
the blade tip zone corresponds to the height interval between 90% height and 100% height of the blade, and can more particularly designate the height interval between 95% height and 100% height; the fact that the chord is locally constant in a blade root zone signifies that in this zone, the chord assumes values close to one another so that the maximum relative gap between two values assumed by the chord in this zone is 10%, preferably 5% or even more preferably 2%.

The fact that the chord is locally constant in the blade mid-height zone signifies that in this zone, the chord assumes values close to one another so that the maximum relative gap between two values assumed by the chord in this zone is 10%, preferably 5% or even more preferably 2%.

The fact that the chord is locally constant in the blade root zone is illustrated in FIG. 5 by the fact that the tangent to the curve 30 for a height of 0% is vertical, i.e. parallel to the axis of the ordinates. Likewise, the locally constant chord in the blade mid-height zone is illustrated in FIG. 5 by the fact that the tangent to the curve 30 for a height of 50% is vertical, i.e. parallel to the axis of the ordinates. This tangent is shown for the height of 50%.

As a further variant, the chord law can also comply with other features, which also contribute to increasing flutter margins.

The chord can for example be constant between the blade root (0% height) and the first quarter of the blade height (25% height), as well as between the third quarter of the blade height (75% height) and the blade tip (100% height).

Figure 6:
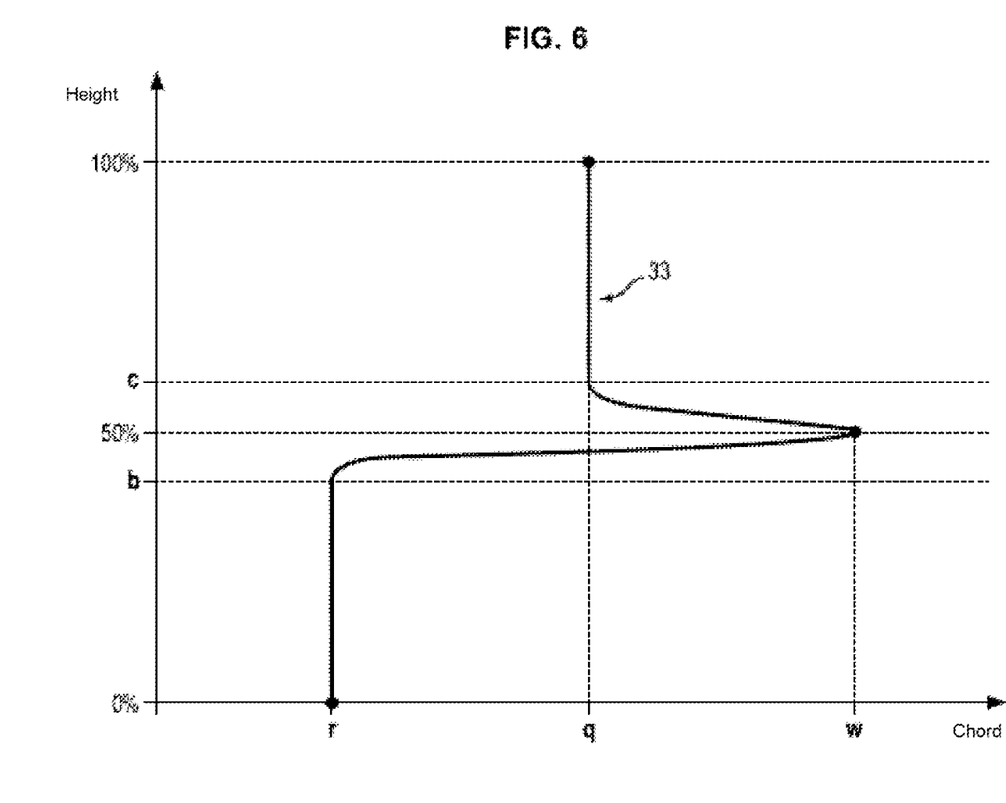

The curve 33 in FIG. 6 shows the variations of the chord of the blade cross section as a function of its height. The curve 33 corresponds to a constant chord between the blade root (0% height) and the blade height b, and a constant chord between the blade height c and the blade tip (100% height).

The chord has value r for a height of 0%, a value w for a height of 50% and a value q for a height of 100%.

The chord varies values from r to w for height percentages from b to 50%.

The chord varies values from w to q for height percentages from 50% to c.

The values of the parameters b and c ensure for example that:
b is comprised between 5% and 15%
c is comprised between 85% and 95%
The values of the chord values r, q and w ensure for example that:
(w/r) is comprised between 140% and 160%, preferably between 145% and 155%
(q/r) is comprised between 115% and 135%, preferably between 120% and 130%

The variations of chord of the blade cross section as a function of its height can correspond to opposite variations of the profile of the leading edge 16 and of the trailing edge 17.

An increase in chord can correspond to a variation of the profile of the trailing edge in the direction of the axis X as shown in FIG. 3, and a variation of the leading edge in the direction opposite to the axis X.

Conversely, a reduction in chord can correspond to a variation of the profile of the trailing edge in the direction opposite to the axis X and a variation of the profile of the leading edge in the direction of the axis X.

In particular the modifications to the chord can be applied so that the center of gravity CG of the blade cross section retains, from one height to another, the same position relative to the axes X and Y. In other words, the coordinates of the center of gravity of the blade cross section along the axes X and Y remain constant from one height Z to another.

Operating Line of a Turbine Engine Fan

Figure 7:
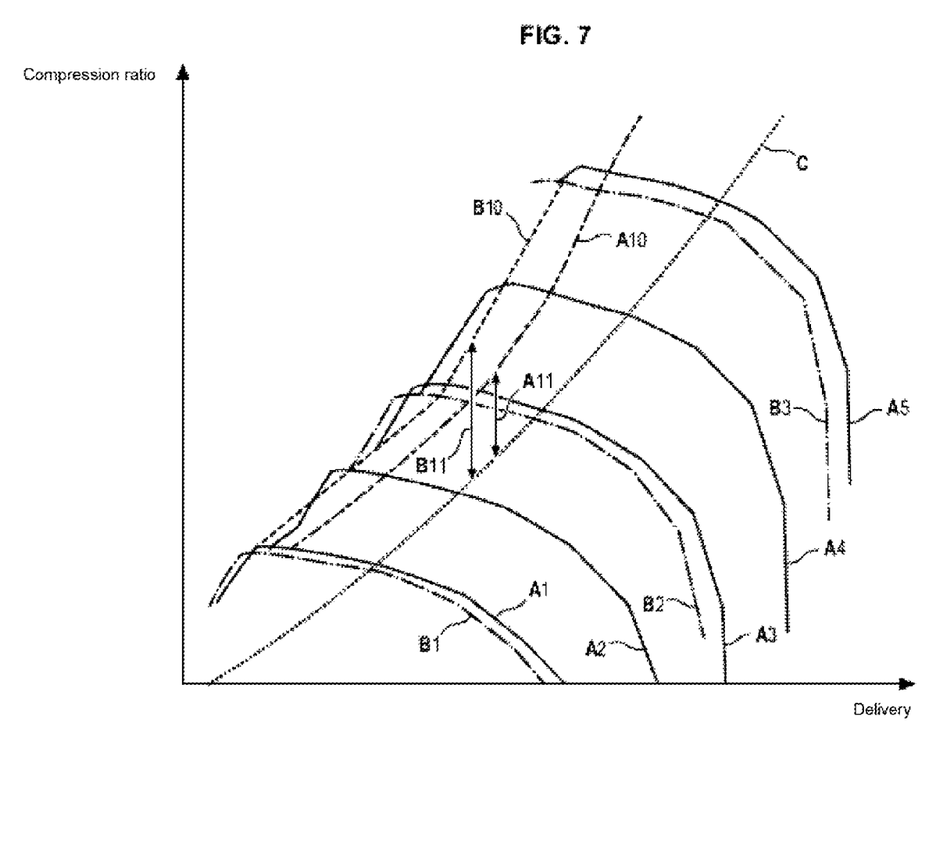
FIG. 7 shows schematically operating lines of a fan conforming to one embodiment of the invention and of a fan of the prior art.

With reference to FIG. 7, the operating lines of a fan show schematically the compression ratio as a function of delivery.

The curves A1, A2, A3, A4 and A5 correspond to five engine regimes, i.e. five speeds of rotation of the engine, involving blades and a fan according to the prior art.

In a given regime, the flight conditions determine a position on the curve or an operating point of the engine, i.e. a pair of compression ratio and delivery values. Ideally, the operating point of the engine is situated near the curve C, which is the nominal operating curve.

The curve A10 embodies the border of the flutter zone according to the same prior art. The operating points of the engine situated on the curves A1, A2, A3, A4 or A5 and to the left of the curve A10 correspond to a strong flutter phenomenon.

The flutter margin can be defined as a distance A11 between the curve C and the curve A10.

Curve B10 embodies the border of the flutter zone of the corresponding engine. The flutter margin can be defined as a distance B11 between the curve B10 and the curve C, the nominal operating curve.

The distance B11 being greater than the distance A11, the flutter margin has been increased relative to known blades of the prior art.

Numerical simulations show that satisfying a chord law as proposed above: reduces the value of flexural coupling
  increases the value of the frequency of the first flexural mode of the blade.

The reduction of flexural-torsional coupling and the increase of the frequency of the first flexural mode of the blade tend to reduce the effect of friction and to increase the flutter margin.

One advantage conferred by chord laws as presented above is better resistance to the loss of a blade, i.e. an increase in resistance to the "Fan Blade Out" or blade ejection phenomenon.

On the one hand, a blade with a greater cord around a height percentage of 50% has a smaller risk of breaking or detaching from the disk.

On the other hand, in the event of breakage of a blade, the broken blade will collide with its neighboring blades in the 50% height percentage zone. The neighboring blades have a better resistance to collision thanks to a greater chord in said zone.

The invention claimed is:

1. A blade for a rotor in a turbine comprising
   a plurality of blade cross sections stacked along an axis Z between a blade root and a blade tip defining therebetween the height of the blade,
   each blade cross section including a leading edge and a trailing edge and a chord defined by the length of the segment which extends from the leading edge to the trailing edge,
   wherein:
     the ratio of the chord at mid-height and of the chord at the blade root is comprised between 140% and 160%;
     the ratio of the chord at the blade tip and of the chord at the blade root is comprised between 115% and 135%,
   wherein a curve of the chord of a blade cross section as a function of the height varies continuously as a function of the height, and a slope of a tangent to the curve of the chord varies continuously as a function of the height,
   wherein the chord is locally constant in a blade root zone so that the tangent to the curve of the chord at the blade root assumes a constant value as a function of the height and
   the chord assuming a plurality of values in a blade mid-height zone so that, for each couple of two values of the plurality of values in the blade mid-height zone, a relative difference between the two values is less than 10%.

2. The blade according to claim 1, wherein:
   the ratio of the chord at mid-height of the blade and of the chord at the blade root is comprised between 145% and 155%;
   the ratio of the chord at the blade tip and of the chord at the blade root is comprised between 120% and 130%.

3. The blade according to claim 1, wherein:
   the chord is constant between the blade root and a blade height of 5%, and
   the chord is constant between a blade height of 95% and the blade tip.

4. The blade according to claim 3, wherein:
   the chord is constant between the blade root and a blade height of 15%, and
   the chord is constant between a blade height of 85% and the blade tip.

5. The blade according to claim 4, wherein:
   the chord is constant between the blade root and a blade height of 25%, and
   the chord is constant between a blade height of 75% and the blade tip.

6. The blade according to claim 1, wherein the chord is locally constant in a blade tip zone so that the tangent to the curve of the chord at the blade tip assumes a constant value as a function of the height.

7. A turbine engine fan including a plurality of blades according to claim 1.

8. A turbine engine including a turbine engine fan according to claim 7.

* * * * *